US012679379B2

(12) United States Patent
Dasher et al.

(10) Patent No.: US 12,679,379 B2
(45) Date of Patent: Jul. 14, 2026

(54) LATERAL UNDULATION OPERATION FOR FOUR WHEEL STEERED VEHICLES WITH VERTICAL SUSPENSION CONTROL

(71) Applicant: Adeia Guides Inc., San Jose, CA (US)

(72) Inventors: Charles Dasher, Lawrenceville, GA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 225 days.

(21) Appl. No.: 18/512,483

(22) Filed: Nov. 17, 2023

(65) Prior Publication Data
US 2025/0313209 A1 Oct. 9, 2025

(51) Int. Cl.
*B60W 30/18* (2012.01)
*B60W 10/04* (2006.01)
(Continued)

(52) U.S. Cl.
CPC ...... *B60W 30/18172* (2013.01); *B60W 10/04* (2013.01); *B60W 10/20* (2013.01);
(Continued)

(58) Field of Classification Search
CPC . B60G 2800/21; B60G 2800/213–215; B60W 10/04; B60W 10/20; B60W 10/22; B60W 30/18045; B60W 30/18172; B60W 2300/185; B60W 2520/26–266; B60W 2552/05; B60W 2552/15; B60W 2710/207; B60W 2710/22; B60W 2720/40–406; G05D 1/0061; G05D 1/0088; G05D 1/021; G05D 1/0214; G05D 1/0221; G05D 1/0223
See application file for complete search history.

(56) References Cited

U.S. PATENT DOCUMENTS 7,164,365 B2 1/2007 Doherty et al.
7,808,256 B2 10/2010 Murakami et al.
(Continued)

FOREIGN PATENT DOCUMENTS

CN 116476587 A * 7/2023 ........... B60G 17/016
MX 2021005729 A 6/2021

OTHER PUBLICATIONS

Jin, CN 116476587, machine translation. (Year: 2023).*
(Continued)

*Primary Examiner* — Mark L. Greene
(74) *Attorney, Agent, or Firm* — HG Law LLP

(57) ABSTRACT
The weigh of a vehicle body may be shifted onto selected wheels using the adjustable suspension systems of the vehicle to induce an undulating motion sequence of the vehicle. This may aid the vehicle to regain traction when a wheel is stuck. A first wheel may be turned in a first direction and more of the vehicle weight may be shifted onto the first wheel, while spinning one or more wheels, then this may be repeated for each wheel of the vehicle sequentially. More or less torque may be applied to the wheel onto which more of the vehicle's weight is shifted. The four-wheel sequence may be done at a predefined cadence and repeated as necessary. Also, based on terrain depth sensor signaling, an optimal weight distribution of the vehicle may be determined to aid vehicle movement on a hilly or off-road terrain.

18 Claims, 13 Drawing Sheets

(51) Int. Cl.
_B60W 10/20_ (2006.01)
_B60W 10/22_ (2006.01)

(52) U.S. Cl.
CPC ....... _B60W 10/22_ (2013.01); _B60G 2800/213_
(2013.01); _B60G 2800/214_ (2013.01); _B60W_
_2300/185_ (2013.01); _B60W 2520/26_ (2013.01);
_B60W 2552/05_ (2020.02); _B60W 2552/15_
(2020.02); _B60W 2710/207_ (2013.01); _B60W_
_2710/22_ (2013.01); _B60W 2720/40_ (2013.01)

(56) References Cited

U.S. PATENT DOCUMENTS

| | | | |
|---|---|---|---|
| 12,384,219 B2 * | 8/2025 | Mistry | .............. B60G 17/0165 |
| 2022/0097704 A1 | 3/2022 | Collins | |
| 2024/0109385 A1 * | 4/2024 | Mistry | .............. B60G 17/0195 |

OTHER PUBLICATIONS

Fred Lambert, "Watch beat-up GMC Hummer EV crab walk in traffic", (Apr. 19, 2021), (https://electrek.co/2021/04/19/gmc-hummer-ev-crab-walk-in-traffic-video/), (7 pages).
Motor Illustrated, "2020 Mercedes-Benz GLE Bounce Mode—E-Active Body Control", (Uploaded Oct. 2, 2019), (https://www.youtube.com/watch?v=ADqhdS5CBmo),(3 pages).
YouTube, "Lateral Undulation, as observed in snakes and some types of fish, involves a side-to side, wave-line motion", (https://www.youtube.com/watch?v=ZKaYbMZqTkY), (2 pages).

* cited by examiner

Continue
motion
sequence
as at T2

FIG. 3A

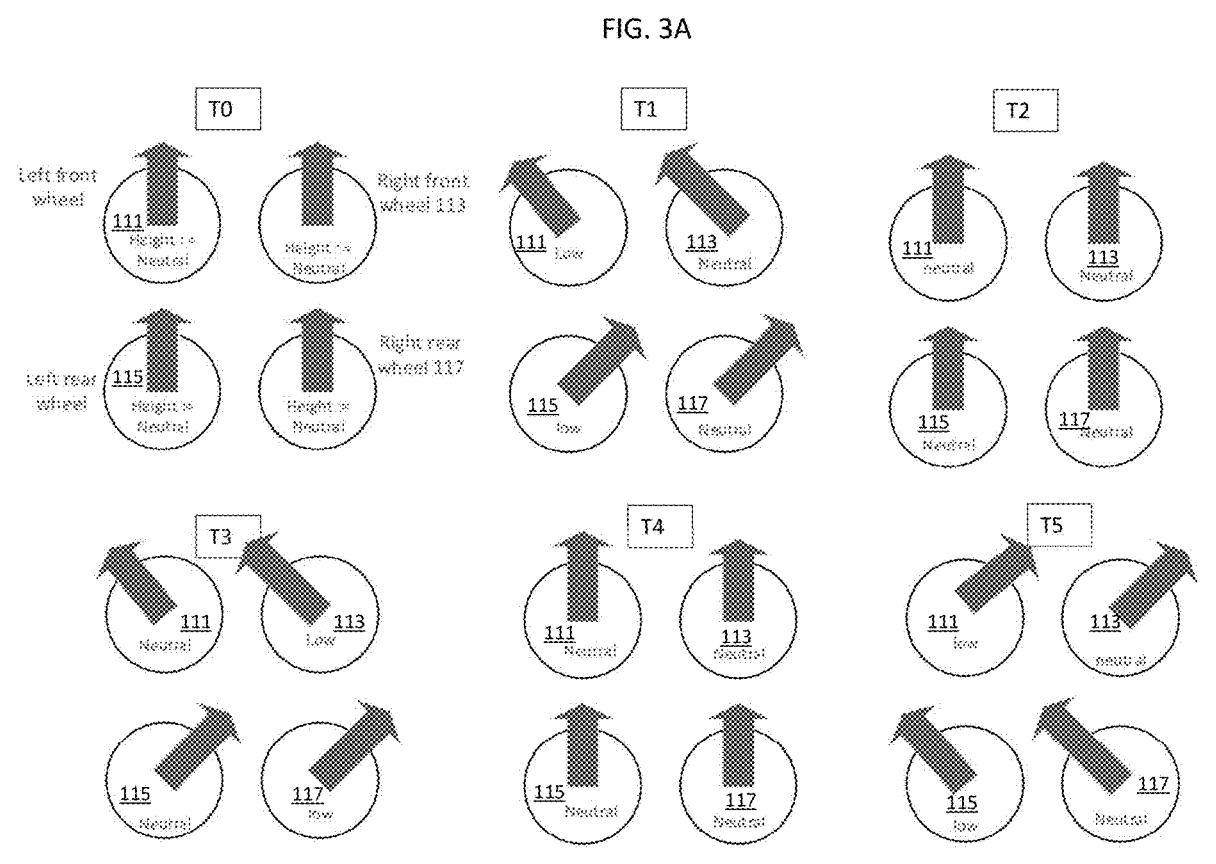

| T0 | | | T1 | | | T2 | | |

Left front
wheel
111
Height is
Neutral

Right front
wheel 113
Height is
Neutral

111
Low

113
Neutral 111
neutral

113
Neutral

Left rear
wheel
115
Height is
Neutral

Right rear
wheel 117
Height is
Neutral 115
low

117
Neutral

115
Neutral

117
Neutral

| T3 | | | T4 | | | T5 | | |

111
Neutral

113
Low

111
Neutral

113
Neutral 111
low 113
neutral

115
Neutral 117
low

115
Neutral

117
Neutral 115
low

117
Neutral

Continue
like at T1

900

1000

LATERAL UNDULATION OPERATION FOR FOUR WHEEL STEERED VEHICLES WITH VERTICAL SUSPENSION CONTROL

BACKGROUND

The present disclosure relates to generating a movement sequence of a vehicle by shifting the vehicle's weight distribution to improve wheel traction when the vehicle is stuck and to improve vehicle operation when the vehicle is moving on an inclined or off-road terrain.

SUMMARY

Automobiles, trucks, busses and other vehicles sometimes lose traction with the substrate, for example, mud, snow or dry sand, on the ground on which they are driving, and thus get stuck. As one or more wheels lose their grip, they may spin fast but not propel the vehicle forward and may even dig themselves deeper into the substrate.

In one approach for vehicles with four-wheel drive, both the front wheels and the rear wheels of a vehicle are turned laterally (away from the longitudinal axis of the vehicle) in the same direction. In this mode, sometimes called "crab walking," the vehicle moves simultaneously forward and laterally. However, this approach does not provide for vehicle weight distribution or redistribution to get the vehicle unstuck, nor does it address providing more traction to a wheel that is stuck in the mud or other substrate.

In another approach, an automobile has a "bounce mode" in which the suspension of the vehicle is pumped to move the entire automobile rhythmically up and down relative to the wheels. However, bouncing of the vehicle does not distribute more of the weight of the vehicle onto individual wheels. Further, the bouncing of the vehicle does not necessarily propel forward the vehicle, and the bouncing is not orchestrated with wheel turning or wheel power control.

A technological solution provided according to an aspect of the disclosure is a sequence of actions implemented pursuant to signals transmitted by control circuitry, for example, of a vehicle's electronic control unit, to various components of the vehicle. The sequence of actions entails shifting more of the vehicle weight onto a first wheel by lowering, using an adjustable suspension system, the ride height of a portion of the vehicle at the first wheel, and maintaining a higher vehicle ride height of the remainder of the vehicle at the wheels other than the first wheel and/or by elevating the ride height of the remainder of the vehicle at the wheels other than the first wheel. Or, if the portion of the vehicle at the other wheels is sufficiently raised, then the ride height of the portion of the vehicle at the first wheel may be maintained and/or lowered. At the same time, or shortly before or after, the first wheel is turned laterally and the first wheel is spun. The remaining wheels may also be powered to spin at this time. The first wheel with the added weight may also be spun with more torque. Subsequently, more of the weight is shifted onto a second wheel by lowering a portion of the vehicle ride height at the second wheel and maintaining a higher vehicle ride height at the wheels other than the second wheel and/or elevating the vehicle to a higher ride height at the wheels other than at the second wheel. At this time, or shortly before or after, the second wheel is turned laterally in the same direction as the first wheel, and while powering the second wheel spin. The remaining wheels may also be spun. The process is repeated in sequence for each wheel.

The process may start with a first wheel at a first end of the vehicle and then continue for a second wheel adjacent the first wheel at the same end of the vehicle. For example, if the first end of vehicle is the front of the vehicle, then the first wheel may be a front wheels, then the process may move to a second wheel, also at the front, then the process may move to a third wheel, which may be a rear wheel behind the first wheel. Or the second wheel in the sequence may be the rear wheel behind the front wheel, and the third wheel in the sequence may be the other front wheel. In another embodiment, the second wheel in the sequence may be the rear wheel that is not behind the first wheel, and the third wheel in the sequence may be the other front wheel.

In a four wheel vehicle, after the sequence is completed for the fourth wheel, the wheels may be brought back to be aligned with the longitudinal axis of the vehicle. After that time, the entire sequence may be repeated for each wheel. However, on this second sequence, each wheel, in sequence, may be turned away from the longitudinal axis of the vehicle toward a second side of the vehicle.

This process may be repeated for each of the four wheels of the vehicle in response to a set of automated commands to various vehicle components. The sequence of actions may be triggered in response to user request or in response to determination, based on vehicle sensor data generated and received in real time, of loss of traction of one or more wheels.

In an embodiment, this shifting of the weight from wheel to wheel may be performed at a smooth pace to induce an undulation of the vehicle that moves the vehicle simultaneously forward (or rearward) and laterally, in the direction to which the wheels are sequentially turned, to dislodge the vehicle and to reestablish wheel traction. The vehicle may as a consequence of these operations undergo a serpentine undulation, a complex wave-like motion that moves from front to rear, similar to the way a snake moves. The sequence of operations may be repeated and performed continuously and the vehicle may be induced to undulate repeatedly. This may approximate a serpent-like slither movement of the vehicle as the vehicle moves to one side and forward and then to another side and forward. The sequence of operations may be continued until vehicle sensor data indicates that sufficient traction has been re-gained by one, two, three or all the wheels, or when a driver stops the sequence.

The speed of the shifting of weight from one wheel to another may be set in advance as part of a default setting, and this speed may be varied in real time based on vehicle sensor data. The amount of the lowering the vehicle to each wheel and/or the amount of elevating the remaining portion of the vehicle onto the other wheels may be set in advance as part of a default setting, and these heights, or height differentials compared to normal operating vehicle height, may be varied in real time based on vehicle sensor data. Also, the amount that a wheel is turned away from the longitudinal axis of the vehicle may be set in advance as part of a default setting, and this tuning angle may be varied in real time based on vehicle sensor data. One or more wheels may be turned away from the longitudinal axis of the vehicle more than other wheels in any four-wheel sequence. For example, a wheel indicated as lacking sufficient traction may be turned more away from the longitudinal axis of the vehicle than the other wheels, or the wheel lacking sufficient traction may be turned less away from the longitudinal axis of the vehicle than the remaining wheels.

An apparatus, a system, a method and means for implementing the method are described. Such a method may include: receiving a signal to start a motion sequence for a vehicle; causing the vehicle to perform the motion sequence, by performing operations including: (a) shifting more of a weight of the vehicle onto a first wheel of wheels of the vehicle compared to a weight of the vehicle borne by any of other wheels of the vehicle; (b) turning the first wheel away from a longitudinal axis of the vehicle; (c) spinning the first wheel of the vehicle; and (d) repeating operations (a)-(c) for each of the other wheels of the vehicle sequentially. With each four-wheel sequence, the wheels may be turned in a direction opposite from the previous four-wheel sequence.

In operation (b), all wheels of the vehicle may be spun or just some of them. More toque, or less torque, may be applied to the wheel onto which more of the vehicle's weight is shifted. The operations (a)-(c) may be performed simultaneously, or the operations (a)-(c) may be performed in the following order: (b) followed by (a) followed by (c) followed by (d).

According to an aspect of the disclosure, the operation (b) may include: spinning the wheels of the vehicle in a first spinning direction, and the motion sequence may further entail: (e) turning all the wheels of the vehicle to be aligned with the longitudinal axis of the vehicle; and then (f) turning the first wheel away from the longitudinal axis of the vehicle in a second direction different from the first direction; (g) shifting more of the weight of the vehicle onto the first wheel compared to the weight of the vehicle borne by any of other wheels of the vehicle; (h) spinning the first wheel of the vehicle; and (i) repeating operations (f)-(g) for each of the other wheels of the vehicle sequentially. Variations of these operations, including various other sequences and permutations, and various additional combinations of operations at each step, are also contemplated. For example, a further operation (h) may entail spinning the wheels of the vehicle in a first spinning direction, and the motion sequence may also entail: (j) aligning all the wheels of the vehicle with the longitudinal axis of the vehicle; and then; (k) continually repeating steps (a)-(j) until receiving a signal to stop the motion sequence for the vehicle.

The motion sequence may be stopped by the driver or, in an embodiment, may be stopped automatically in response to a stop signal received when a vehicle sensor signal indicates that one or more wheels of the vehicle has/have sufficient traction. The operation (a) may include: lowering, using an adjustable suspension system associated with the first wheel, a first portion of the vehicle to a first ride height at the first wheel, wherein the first ride height is lower than a second ride height of a remaining portion of the vehicle at the other wheels of the vehicle. The operation (a) may entail: elevating, using an adjustable suspension systems associated with wheels of the vehicle other than the first wheel, a first portion of the vehicle to a first ride height at the wheels of the wheels other than the first wheel, wherein the first ride height is higher than a second ride height of the vehicle at the first wheel.

Throughout the motion sequence, vehicle sensor data may be received by the electronic control unit (ECU) or other onboard processor that commands vehicle system, and the ECU or other onboard processor may transmit commands to adjust a first ride height of the vehicle at the first wheel and/or to adjust a second ride height of a remaining portion of the vehicle at the other wheels of the vehicle. The second ride height of the vehicle as that term is used in this paragraph means that the second ride height is higher than the first ride height of the vehicle. In response to receiving the vehicle sensor data, the ECU may command adjusting how far the first wheel is turned away from the longitudinal axis of the vehicle. The operation (d) may further include: in response to receiving vehicle sensor data, adjusting a speed of the repeating of operations (a)-(c).

The first wheel may be at a first end of the vehicle—the first end being remotest from a second end of the vehicle, and the first wheel may be at a first lateral side of the vehicle. In such a setup, the operation (d) may entail: first repeating the operations (a)-(c) for a second wheel of the wheels of the vehicle—the second wheel in this case may be at the first end of the vehicle and at a second lateral side of the vehicle (the second lateral side being remote from the first lateral side). The operation (d) may entail: after the repeating of the operations (a)-(c) for the second wheel, repeating next the operations (a)-(c) for a third wheel of the wheels of the vehicle at the second end of the vehicle and at the first lateral of the vehicle.

If the first wheel is at a first end of the vehicle and at a first lateral side of the vehicle, then the operation (d) may entail: first repeating the operations (a)-(c) for a second wheel at the second end of the vehicle at the first lateral side. Then the operations (a)-(c) may be repeated next for a third wheel at the first end of the vehicle and at the second lateral side of the vehicle.

The sequence of operations described may be launched in response to the ECU determining, based on vehicle sensor data, that one or more wheels of the vehicle lacks sufficient traction. In response to such a determination, the signal to start the motion sequence for the vehicle may be generated automatically by the ECU.

In an embodiment, the two front wheels may be turned in one direction while the two rear wheels may be turned in a second direction different from the first direction. More of the weight of the vehicle may be shifted to a first side of the vehicle than to a second side of the vehicle. Greater torque may be applied to one or more wheels than to other wheels at this time. As a following set of operations, the front wheels may be turned in the second direction while the rear wheels are turned in the first direction. At this point, more of the weight of the vehicle may be shifted onto the second side than to the first side, or the vehicle weight distribution may be kept until the following time the wheels are turned. At the following point in time, the front wheels may be turned back to the first direction while the rear wheels are turned to the second direction. More of the weight of the vehicle may be shifted onto the second side than to the first side, or more of the weight of the vehicle may be shifted onto the first side than to the second side. In between times when the wheels are turned or when the weight of the vehicle is shifted, the wheels may be brought to a straight position (substantially aligned with the longitudinal axis of the vehicle) and the weight distribution may be normalized.

A variation of the method according to a further embodiment may include: receiving a signal to start a motion sequence for a vehicle; causing the vehicle to perform the motion sequence by transmitting instructions automatically to commence a first set of operations that include: (a) turning front wheels in a first direction away from a longitudinal axis of the vehicle; (b) turning rear wheels in a second direction away from the longitudinal axis of the vehicle; (c) shifting more of a weight of the vehicle onto wheels on a first side of the vehicle than the weight of the vehicle borne by wheels on a second side of the vehicle; (d) spinning both the front wheels and the rear wheels of the vehicle; and then continuing to cause the vehicle to perform the motion sequence by transmitting instructions automatically to commence a second set of operations comprising: (e) turning the front wheels in the second direction away from the longitudinal axis of the vehicle; (f) turning the rear wheels in the first direction away from the longitudinal axis of the vehicle; (g) shifting more of the weight of the vehicle onto the wheels on the first side of the vehicle or onto the wheels on the second side of the vehicle than the weight of the vehicle borne by remaining wheels of the vehicle; and (h) spinning both the front wheels and the rear wheels of the vehicle. The first set of operations (a)-(d) may be repeated followed by the second set of operation (e)-(h). The operations (a)-(c) may be performed simultaneously, or the operations (a)-(c) may be performed in the following order: (a) followed by (b) followed by (c).

Such a motion sequence may also include aligning, before operation (e), all the wheels of the vehicle with the longitudinal axis of the vehicle. The first set of operations may be repeated and the second set of operation may be continued until a signal to stop the motion sequence is received. The signal to stop the motion sequence may be automatically transmitted by the ECU in response to receiving vehicle sensor data indicating that one or more wheels of the vehicle has/have sufficient traction.

In a terrain movement embodiment for aiding a vehicle in traversing hilly or uneven terrain, including offroad terrain, terrain depth sensors, weight sensors at the suspensions systems at each wheel, and other information may be used to optimize vehicle weight distribution. Real time sensor data may be used to balance out the weight of the vehicle across the wheels and/or to raise or lower the vehicle body using the suspension systems at each wheel, such that the vehicle body is more or less level, or at least closer to level than without the attempt to level the vehicle body. For example, when the vehicle climbs uphill, the suspension systems at the wheels on the side of the vehicle facing the incline, or the suspension system at a front wheel on the side of the vehicle facing the incline, may be lowered. In this way, the lowered wheel(s) bear(s) more vehicle weight than before the lowering.

An apparatus, a system, a method and means for implementing the method are described for aiding a vehicle moving through inclined, off-road, rocky, muddy, or other difficult terrain. Such a method may include: receiving a signal to start a mode for terrain movement of a vehicle; causing the vehicle to perform the terrain movement by automatically: (a) receiving a signal from a terrain depth sensor; (b) determining, based on the terrain depth sensor signal, an optimal weight distribution of the vehicle—the optimal weight distribution may balance vehicle loads borne by wheels of the vehicle more evenly, or at least less unevenly, than the weight loads borne in a current weight distribution; (c) generating an adjustment of a suspension system at one or more wheels of the vehicle to approximate the optimal weight distribution the vehicle; and (d) simultaneously with operation (c) or after the weight has been shifted, spinning one or more wheels of the vehicle.

In the operation (d), more torque may be applied to a first wheel of the vehicle than to other wheels of the vehicle. The operations (a)-(d) may be repeated until a terrain movement mode stop signal is received by the ECU.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 3A-3B illustrate an example of the motion sequence in which a vehicle's weight is repeatedly redistributed and this is coordinated with turning pairs of wheels simultaneously, according to an aspect of the disclosure;

DETAILED DESCRIPTION

Figure 1B:
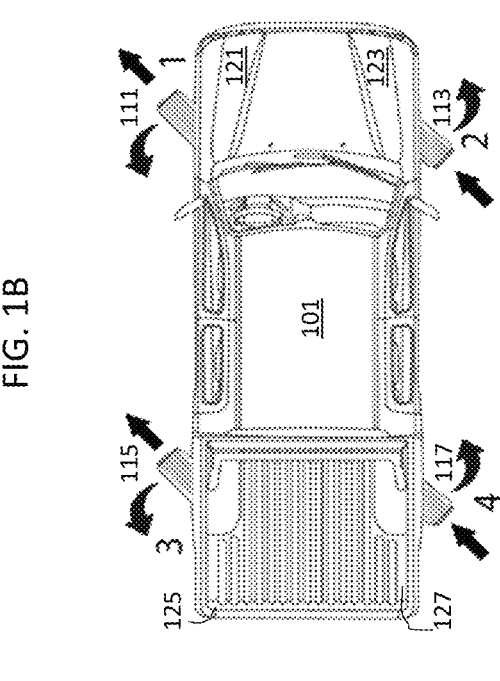
FIGS. 1A and 1B illustrate an example of a process for generating an undulating motion sequence for a vehicle by repeatedly redistributing the vehicle's weight coordinated with turnings of wheels of the vehicle, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

Figure 1A:
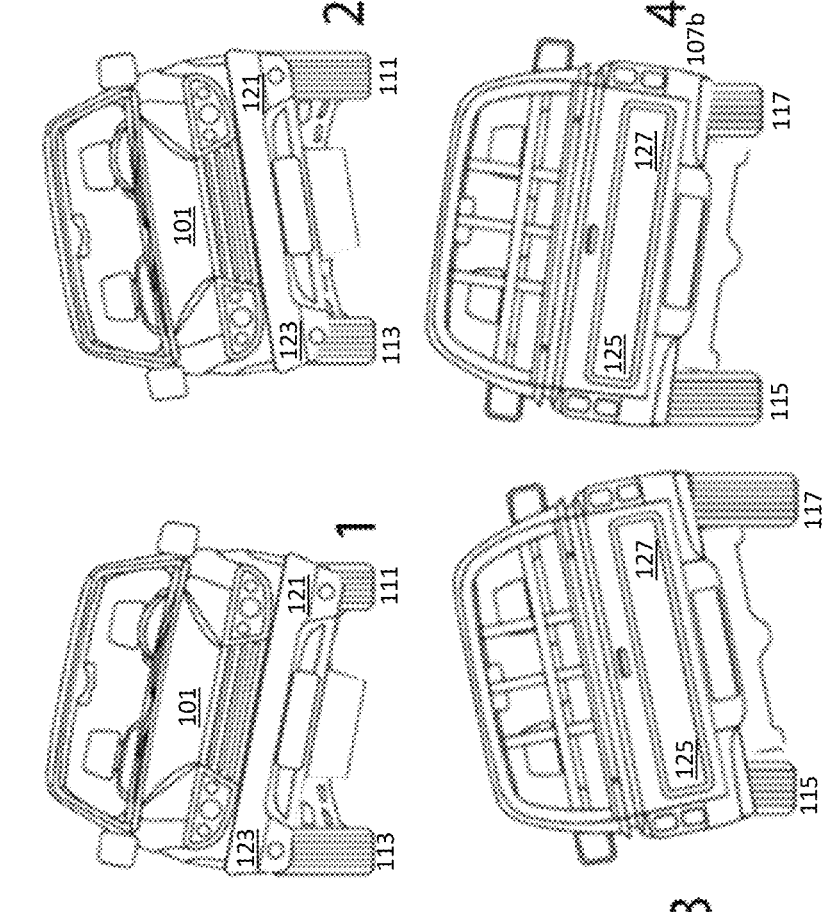

FIGS. 1A-B illustrate an example of a sequence of weight shifting and wheel turns for a vehicle 101, according to an aspect of the present disclosure. While depicted in some of the figures as a pickup truck, the term vehicle may encompass other types of trucks, automobiles, SUVs, vans, buses, or the like. Some of the discussion describes a vehicle with four wheels, however, vehicles with more or fewer than four wheels are also contemplated.

A motion sequence may be commenced automatically in response to one or more sensor signals indicating that one or more wheels has lost traction, or in response to triggering the motion sequence by a driver. The motion sequence may be commenced with the left front wheel 111, as shown in FIG. 1A, however it will be understood that it may be commenced with any of the wheels, or may be commenced at the wheel that has lost traction with the ground.

As shown in FIG. 1A, each wheel is turned in a first direction and more of the weight of the vehicle is shifted to each of the wheels in sequence using the adjustable suspension of the vehicle while at the same time spinning the wheels and/or spinning the weighted wheel—the wheel onto which more weight is shifted—with increased torque. Hydraulic suspension systems and/or electronic actuators at each wheel may control ride height of the vehicle body relative to each wheel. As shown in FIG. 1B, at the end of the four wheel sequence, for the next sequence each of the four wheels may be turned in a lateral direction—away from the longitudinal axis of the vehicle 101—different from the lateral direction of the previous four wheel sequence.

Figure 2A:
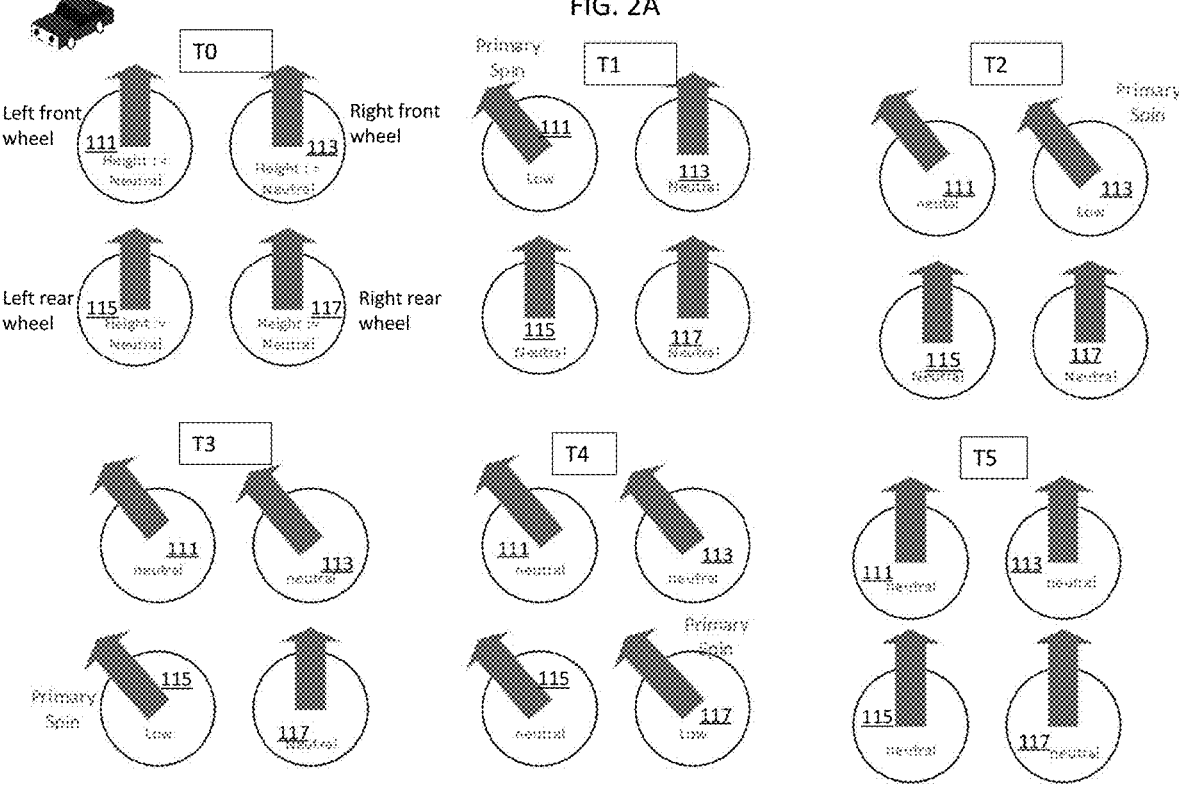
FIGS. 2A-2B illustrate an example of a motion sequence in which a vehicle's weight is repeatedly redistributed and this is coordinated with turning of vehicle wheels, according to an aspect of the disclosure.
Figure 2B:
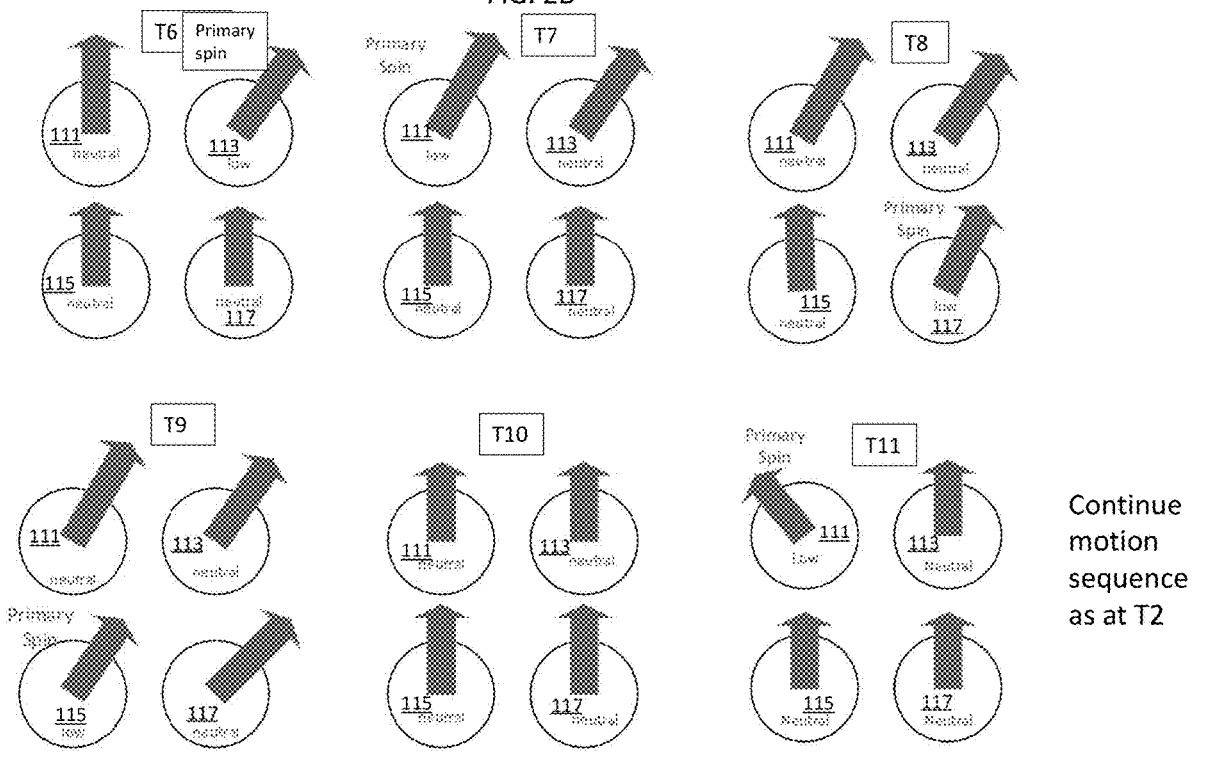

A time series of a motion sequence according to a first embodiment of the disclosure is shown in FIGS. 2A-2B. At time zero, the vehicle may be attempting to move forward with all four wheels pointing forward—parallel to the longitudinal axis of the vehicle 101, and with the suspension systems at a neutral or normal driving height. At time T1, the left front wheel 111 of the vehicle 101 may be turned in a lateral direction away from the longitudinal axis of the vehicle 101. At substantially the same time, or shortly after or before the left front wheel 111 is turned, more of the weight of the vehicle 101 may be shifted onto the left front wheel 111. This shifting of weight may be accomplished by lowering an adjustable suspension system of the vehicle body at the left front wheel 111 to a low ride height. As shown in FIG. 1A, at time T1, a left front portion of the vehicle body 121 of the vehicle closest to the left front wheel will be lower than the remaining portions 123, 125, 127 of the vehicle 101. In addition to, or instead of, lowering the portion of the left front portion 121 of the vehicle body, the remaining portions of the vehicle 123, 125, 127 may be raised, for example, using the suspension system of the vehicle 101, respectively at the wheels 113, 115, 117

At time T1, all the wheels 111, 113, 115, 117 of the vehicle 101 may be spun. The left front wheel 111 may be spun with greater torque than remaining wheels. The wheel onto which more of the weight of the vehicle is shifted may sometimes be referred to as the weighted wheel. At time T1, the weighted wheel is the left front wheel 111.

In an embodiment, only the weighted wheel, which at T1 is the left front wheel 111, is spun at this time. Vehicle sensor data may be accessed to determine one or more vehicle driving characteristics at the time. If it is determined that wheel traction has been restored, or is sufficient for normal vehicle operation, the motion sequence may be stopped at this time or at any time throughout the motion sequence.

As further shown in FIG. 2A, at time T2, right front wheel 113 becomes the weighted wheel: the right front wheel 113 is turned in the same direction as was the left front wheel 111. It will be understood that while the right front wheel 113 is illustrated to be at the same angle with respect to the longitudinal axis of the vehicle 101 as is the left front wheel 111, the right front wheel 113 may be turned more or less away from the longitudinal axis of vehicle 101 than the angle of the left front wheel 111. Also at time T2, simultaneously with the turning on the right front wheel 113, or before or after the turning of the right front wheel 113, more of the weight of the vehicle is shifted onto the right front wheel 113. The adjustable suspension of the vehicle may be lowered at the right front wheel 113 to lower the right front portion 123 of the vehicle body to a low ride height. In addition to, or instead of, lowering the portion of the left front portion 121 of the vehicle body, the remaining portions of the vehicle 121, 125, 127 may be raised, for example, using the suspension systems of the vehicle 101, respectively at the wheel 101, 105, 107. In an embodiment, all the wheels 111, 113, 115, 117 of the vehicle 101 may be spun at this time. In a further embodiment, the right front wheel 113 may be spun with greater torque than remaining wheels. In an embodiment, only the right front wheel 113 is spun at this time. In an embodiment, all the wheels are spun continuously throughout the motion sequence. In a further embodiment all the wheels are spun continuously throughout the motion sequence and the wheel onto which more of the weight of the vehicle is shifted is spun with greater torque than the remaining wheels. According to an embodiment, when more of the weight of the vehicle is shifted onto one of the front wheels 111, 113 of the vehicle 101, then both front wheels are spun with greater torque than the rear wheels 115, 117; when more of the weight of the vehicle is shifted onto one of the rear wheels 115, 117 of the vehicle 101, then both of the rear wheels are spun with greater torque than the front wheels. According to a further embodiment, when more of the weight of the vehicle is shifted onto a wheel 111, 115 on the left side of the vehicle, then both wheels on the left side of the vehicle are spun with greater torque than are the wheels on the right side 113, 117 of the vehicle, and when more of the weight of the vehicle is shifted onto one of the wheels on the right side 113, 117 of the vehicle, then both of the wheels on the right side of the vehicle 113,117 are spun with greater torque than are the wheels on the left side of the vehicle.

Continuing with time T3 of the motion sequence shown in FIG. 2A, left rear wheel 115 is turned away from the longitudinal axis of the vehicle. The system may turn the left rear wheel 115 to match the angle, relative to the front facing position of the wheels substantially aligned with the longitudinal axis of the vehicle, of the left front wheel 111 and/or to match the angle of the right front wheel 113, or may be turned to a different angle (relative to the front facing position of the wheels substantially aligned with the longitudinal axis of the vehicle) than the left front wheel 111 and right front wheel 113. At substantially the same time, or before or after the turning on the left rear wheel 115, the system may instruct shifting more of the weight of the vehicle onto the left rear wheel 115. The portion of vehicle body 125 at the left rear wheel 115 may thus be lower than other portions of the vehicle body. While FIG. 2A describes the vehicle body at the remaining wheels 111, 113, 117 as being in a neutral position, the vehicle body at the wheels 111, 113, 117 may be raised to a position higher than neutral (higher than normal ride height). Similarly, at each time in the motion sequence at which more of the weight of the vehicle body is shifted onto a wheel, the remaining portions of the vehicle may be raised higher than the normal ride height. All the wheels 111, 113, 115, 117 of the vehicle 101 may be spun at time T3. In an embodiment, the left rear wheel 115 may be spun with greater torque than remaining wheels.

At time T4, the right rear wheel 117 is turned and more of the weight of the vehicle is shifted on to it. The right rear wheel 115 may be turned to match the angle, relative to the front facing position of the wheels substantially aligned with the longitudinal axis of the vehicle, of the left front wheel 111 and/or the angle of the right front wheel 113 and/or the angle of the left rear wheel 115, or the right rear wheel 117 may be turned to a different angle than the left front wheel 111 and/or the right front wheel 113 and/or the left rear wheel 115. At substantially the same time, or before or after the turning the right rear wheel 117, more of the weight of the vehicle is shifted onto the right rear wheel 115. The portion of vehicle body 127 at the right rear wheel 117 may thus be lower than other portions of the vehicle body. While FIG. 2A describes the vehicle body at the remaining wheels 111, 113, 115 as being in a neutral position, but the vehicle body at the wheels 11, 113, 115 may be raised to a position higher than neutral or normal ride height. All the wheels 111, 113, 115, 117 of the vehicle 101 may be spun at time T4. In an embodiment, the right rear wheel 117 may be spun with greater torque than remaining wheels.

Each of times T1, T2, T3, T4 may be of the same duration, for example, 1-15 seconds. In an embodiment, if the system determines that the weighted wheel is one that lacks sufficient traction, then that wheel may be kept as a weighted wheel longer, or shorter, in each four-wheel cycle. For example, if the system determines that the left front wheel is one that lacks sufficient traction, than T1, and in subsequent repetitions of the four wheel cycle in which the left front wheel is the weighted wheel, may be shorter or longer than T2, T3, or T4. In an embodiment, the transition times between T1 and T2, between T2 and T3 three and T4 are as short as possible. In an embodiment, such transition times between T1 and T2, T2 and T3, and T3 and T4, are each the same length, for example, 0.1-3 seconds.

At time T5, all the wheels may be turned back to the front facing position aligned with the longitudinal axis of the vehicle 101 and the suspensions may be brought back to the neutral or normal ride height. In an embodiment, the vehicle body may be raised to a highest ride height at this time. According to an embodiment, time T5 is not of the same duration as times T1, T2, T3, T4 but T5 is merely a quick transitional phase necessary for vehicle components to proceed from T4 to T1. In an embodiment, T5 is a substantial period, equal in length, shorter or longer than T1, T2, T3, T4, in which forward driving of the vehicle is attempted.

FIG. 2B illustrates that at time T6 the right front wheel 113 may become the weighted wheel. That is, the right front wheel 113 is turned away from the forward facing direction and more of the weight of the vehicle is shifted onto it. In the embodiment illustrated in FIG. 2B, at T6, the four wheel cycle starts with the right front wheel 113. However, the four wheel cycle may start with a wheel other than the right front wheel 113. Also, the embodiment illustrated in FIG. 2B, shows that at T6, the four wheel cycle starts with the right front wheel 113 turned right, in the direction opposite to the turning direction of the previous four wheel cycle shown in FIG. 2A, however, in an embodiment, the right front wheel 113 (or whichever wheel is being made the weighted wheel) may be turned in the same direction as in the previous four wheel cycle.

As at times T1, T2, T3 and T4, the weighted wheel, in this case the right front wheel 113, may be spun with greater torque then remaining wheels. According to an embodiment, all the wheels are spun at T6. As further shown in FIG. 2B, the motion sequence is continued with the left front wheel 111 becoming the weighted wheel at T7, followed by the right rear wheel 117 becoming the weighted wheel at T8, and the left rear wheel 115 becoming the weighted wheel at T9. At each of T7, T8, T9, the weighted wheel may be spun with greater torque than the remaining wheels.

At T10, the wheels are turned to face forward as at time T5, the system may continue the motion sequence at T11, in which the wheel alignments, suspension/ride heights/weight distribution of the vehicle body, wheel spin and torque applied to wheels, may be substantially the same as at T1, shown in FIG. 2A. Thereafter, the motion sequence may then continue as at times T2-T11.

Throughout the motion sequence, one or more parameters described herein, including the wheel turning angle/alignment of the weighted wheel or of other wheels, suspension/ride height/weight distribution at the weighted wheel or at other wheels, wheel spin speed or torque applied to the weighted wheel or at other wheels, or the like, may be finetuned based on real time vehicle sensor data. One or more wheel spin sensors, suspension depth sensors, weight sensor, vehicle body level sensors, moisture sensors, and/or vehicle body weight sensors may be positioned at each wheel or at various other portions of the vehicle 101, such as the underside of the vehicle body, and transmit real time data to an onboard computing device, such as an electronic control unit (ECU) of the vehicle. A variety of vehicle data may be transmitted to, accessed by, the ECU, a speed of the vehicle, an acceleration of the vehicle, an acceleration pedal activation of the vehicle, a brake pedal activation of the vehicle, a brake activation of the vehicle, a brake locking of the vehicle, hydroplaning of the vehicle, tire traction of the vehicle, vehicle tire rotation speed of the vehicle, vehicle tire rotation acceleration, steered wheels turning status of the vehicle, a selected gear of the vehicle, a gear stick position of the vehicle, a tachometer reading of the vehicle, a steering wheel position of the vehicle, an airbag activation status of the vehicle, a swerving of the vehicle, a current motion sequence time of the vehicle (indicating how long the vehicle has been performing the motion sequence or how long since the motion sequence initiation signal has been received), wheel traction loss timer (indicating how long since the signal indicating loss of sufficient wheel traction has been received) and/or proximity indicator a position of the vehicle with respect to another vehicle or object. A combination of sensor data may be used by the ECU to diagnose or to determine the existence of one or more relevant conditions or indications.

In an embodiment, in response to real time vehicle sensor data indicating that the wheel(s) lacking sufficient traction is/are not gaining more traction, one or more of such parameters may be adjusted. For example, the ECU of the vehicle 101 may determine, based on real time vehicle sensor data received, or based on driver input, that the rear left wheel 115 is now stuck and thus the ECU may transmit commands to apply greater torque to the rear left wheel than previously. Or the motion sequence may be performed repeatedly such that the rear left wheel 115 is kept as the weighted wheel (shown at times T3 and T9) longer than the other wheels of the vehicle 101.

In an embodiment, after T5 the motion sequence continues with the wheel turning, vehicle body weight distribution, wheel spinning and torque level as shown at T1. That is, the left front wheel 111 may be turned to substantially the same angle as in the previous four-wheel cycle, and so processing may continue as shown at T2, T3, T4 and T5. In this way, vehicle 101 would continue to move, or attempt to move, toward the left.

While FIGS. 2A-2B illustrate that the left front wheel 111 is the first weighted wheel in the motion sequence, it will be understood that any of the wheels may be the first weighted wheel in the motion sequence. Also, while FIGS. 2A-2B illustrate that the right front wheel 113 is the second weighted wheel in the motion sequence, the second weighted wheel may be the wheel behind, or in front of, the first weighted wheel in the motion sequence, or may be the wheel diagonally positioned from the first weighted right rear wheel 117 in the embodiment illustrated). In an embodiment, the first weighted wheel in the motion sequence may be the one at which a lack of sufficient traction is determined by the system or by the driver, or at which the least traction, or at which the most traction, is determined by the system or by the driver. According to an embodiment, the wheels throughout the motion sequence, or for a portion thereof, may spin backward—in the same direction as when the vehicle 101 is in reverse gear.

Figure 3B:
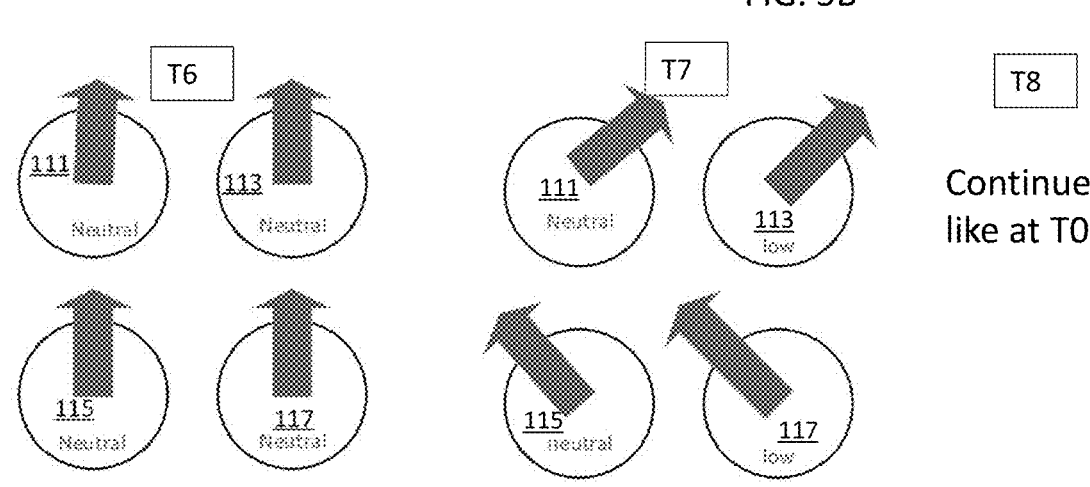

FIGS. 3A-3B illustrate an embodiment in which the front wheels move in tandem and the rear wheels move in tandem. The motion sequence of this embodiment may be performed by a vehicle lacking a drive by wire feature, or with a drive by wire feature.

As shown in FIG. 3A, after T0, at T1 both the left front wheel 111 and right front wheel 113 may turn laterally in the same direction away from the forward-facing direction of the wheels. The left front wheel 111 and right front wheel 113 may turn laterally to the same extent to obtain the same angle relative to the forward-facing position of the wheels, or the right front wheel 113 may turn to a different angle than the left front wheel 111. The weighted wheel may be the left front wheel 111. In the embodiment shown in FIG. 3A, at T1 both the left front wheel 111 and the left rear wheel 115 are weighted wheels at the same time—more of the weight of the vehicle body may be borne by the left front wheel 111 and by the left rear wheel 115 than by the wheels 113, 117 on the right side of the vehicle 101. In an embodiment, when two wheels are made weighted wheels, the ECU attempts to approximately equalize the load borne by each wheel. In a further embodiment, the ECU may instruct lifting of the vehicle body by the suspension systems such that one weighted wheel bears more of the weight than another weighted wheel.

As discussed above with regard to the first embodiment, the weight redistribution/weight shifting of the vehicle body may be accomplished by lowering the ride height of the portion(s) of the vehicle body at the weighted wheel or wheels and/or by elevating the suspension at the remaining wheels. Also at T1, the rear wheels 115, 117 are turned from being parallel to the longitudinal axis of the vehicle so that they face a direction opposite to the direction in which the front wheels are turned. In the example shown in FIG. 3A, at T1 the front wheels 111, 113 are turned left and the rear wheels 115, 117 are turned right.

More torque may be applied to, the weighted wheels, in this case, to the left front wheel 111 and to left rear wheel 115, than to the remaining wheels. Or, more torque may be applied just to left front wheel 111 than to the remaining wheels. In a further embodiment, more torque may be applied to both front wheels 111, 113 than to the remaining wheels. In an embodiment all the wheels may be spun at T1.

At time T2, all the wheels may be turned back to the front facing position aligned with the longitudinal axis of the vehicle 101 and the suspensions may be brought back to the neutral or normal ride height, or they may be brought to a higher ride height than normal. In an embodiment, at this time the vehicle body may be raised to the highest ride height that the vehicle suspension systems are able to provide. According to an embodiment, time T2 is not of the same duration as times T1, T3, but rather T2 is merely a quick transitional phase necessary for vehicle components to proceed from T1 to T3. In an embodiment, T2 is a substantial period, equal in length, shorter or longer than T1 and T3 in which the forward driving of the vehicle is attempted.

At T3, the front wheels 111, 113 are turned to left, while the rear wheels 115, 117 are turned right and the suspension systems are adjusted such that the weighted wheels become the wheels 113, 117 on the right side of the vehicle. As discussed with regard to T1 of FIG. 3A, an additional wheel may be made a weighted wheel in addition to, or instead of, wheels 113, 117, or, only one of the wheels 113, 117 may be a weighted wheel. Additional torque may be applied to one or more of the weighted wheels 113, 117, to one or more of the front wheels 111, 113, to one or more of the rear wheels 115, 117 and/or to one or more of the non-weighted wheels 111, 115.

At T4 and at subsequent positions in which all the wheels point forward, the wheel turning angle/alignment of the wheels, suspension/ride height/weight distribution, wheel spin speed or torque applied to the wheels, or the like, may be the same as at T2. Or, one or more such parameters may be varied. For example, the duration of T4 or such a subsequent period, may be varied if it desired to attempt to move the vehicle forward (or rearward) for a shorter or longer time.

At T5, the suspension/ride height/weight distribution at the weighted wheel or at other wheels may be the same as at T1, except that the weighted wheels may be the wheels 111, 115 on the left side of the vehicle 101. Or, only one of the wheels 113, 117 may be a weighted wheel. As discussed, an additional wheel may be made a weighted wheel instead of, or in addition to, left wheels 111, 115. Additional torque may be applied to one or more of the weighted wheels 111, 115, to one or more of the front wheels 111, 113, to one or more of the rear wheels 115, 117 and/or to one or more of the non-weighted wheels 115, 117.

Turning to FIG. 3B, at T6, the wheel turning angle/alignment of the wheel wheels, suspension/ride height/weight distribution, wheel spin speed or torque applied, or the like, may be the same as at T2. Or, one or more such parameters may be varied. For example, the duration of T6, may be varied if a different length of time is deemed necessary to attempt to move the vehicle forward (or rearward).

At T7, the front wheels 111, 113 are turned to the right, while the rear wheels 115, 117 are turned to the left and the suspension systems are adjusted such that the weighted wheels become the wheels 113, 117 on the right side of the vehicle 101. Additional torque may be applied to one or more of the weighted wheels 113, 117, to one or more of the front wheels 111, 113, to one or more of the rear wheels 115, 117 and/or to one or more the non-weighted wheels 111, 115. The motion sequence may thereafter continue as illustrated at T0-T7.

Figure 4:
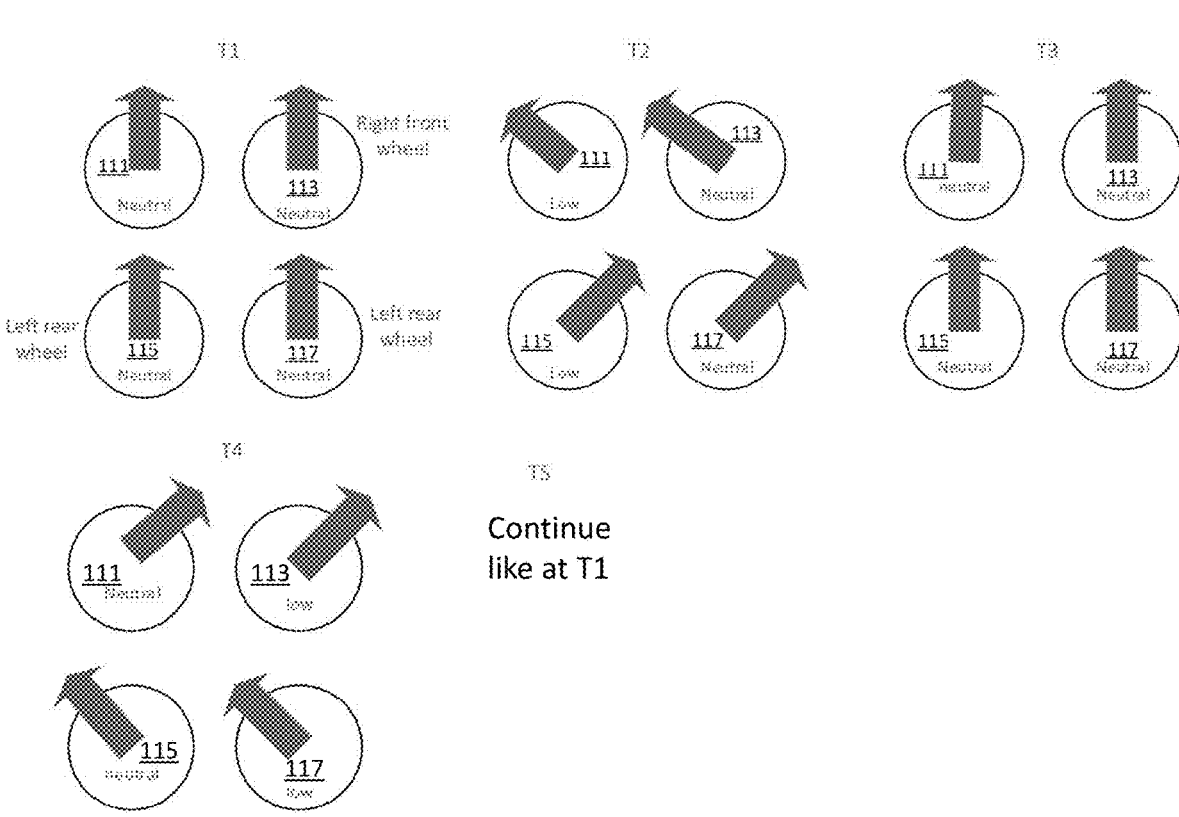
FIG. 4 illustrates another version of the motion sequence also entailing turning sets of two wheels simultaneously, according to an aspect of the disclosure.

FIG. 4 illustrates an embodiment similar to the embodiment illustrated in FIGS. 3A-3B, except that the weight of the vehicle is shifted each time the wheels are turned. That is, at T2 the front wheels 111, 113 point left and the rear wheels 115,117 point right, while the weighted wheels are the wheels 111, 115 on the left side of the vehicle; and at T4, the front wheels 111, 113 point right and the rear wheels 115, 117 point left, and the weighted wheels are the wheels 113, 117 on the right side of the vehicle. At T5, the motion sequence is continued like at T1.

Figure 5:
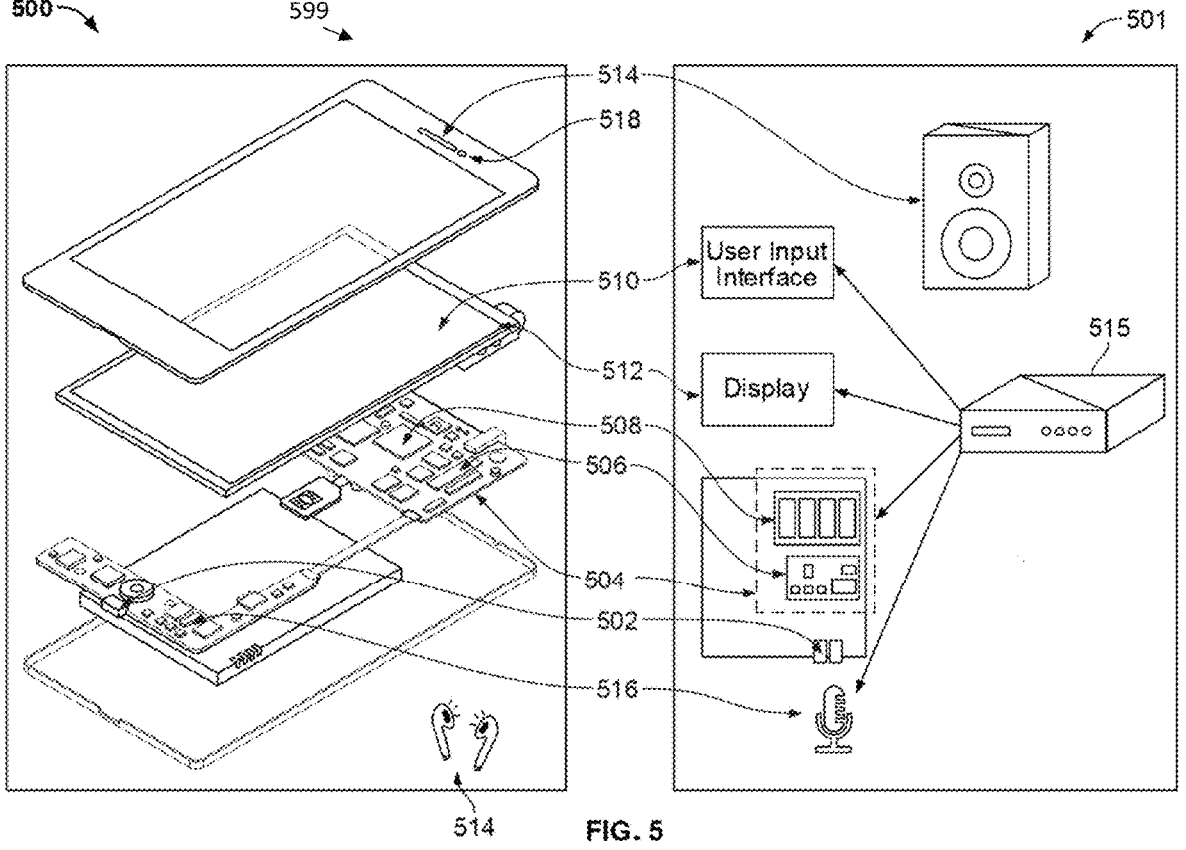
FIG. 5 illustrates a system according to an aspect of the disclosure.

FIG. 5 illustrates an example of an implementation of a system 500, which may comprise an ECU and some components thereof, that may receive vehicle sensor data and driver input and may transmit instructions to various components and systems of the vehicle 101 to control the motion sequences described herein.

System 500 may receive content and data via input/output (I/O) path 502 that may comprise I/O circuitry (e.g., network card, or wireless transceiver). I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry (sometime referred to as communication circuitry). I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable circuitry and may include processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 504 executes instructions for an AR application stored in memory (e.g., storage 508).

In client/server-based embodiments, control circuitry 504 may include communications circuitry suitable for communicating with a server or other networks or servers. Computing device 404 may be a part of a local area network with one or more of devices 500 or may be part of a cloud computing environment accessed via the internet. In a cloud computing environment, various types of computing services for performing searches on the internet or informational databases, providing AR generation, providing storage (e.g., for a database) or parsing data (e.g., using machine learning algorithms described above and below) are provided by a collection of network-accessible computing and storage resources (sometimes referred to as "the cloud").

Control circuitry 504 may include communications circuitry suitable for communicating with a server, edge computing systems and devices, a table or database server, or other networks or servers The instructions for carrying out the above mentioned functionality may be stored on a server. Communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 5, may be used to supplement storage 508 or instead of storage 508.

Control circuitry 504 may include video and audio and/or audible output generating circuitry and tuning circuitry. Encoding circuitry (e.g., for converting over-the-air, analog, or digital signals to MPEG signals for storage) may also be provided. Control circuitry 504 may also include scaler circuitry for upconverting and down converting content into the preferred output format of system 500. Control circuitry 504 may also include digital-to-analog converter circuitry and analog-to-digital converter circuitry for converting between digital and analog signals. The tuning and encoding circuitry may be used by system 500, 501 to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors.

Control circuitry 504 may receive instruction from a user by way of user input interface 510. User input interface 510 may be any suitable user interface, such as dashboard controllers, an onboard command console or touch screen, a touchpad, stylus input, joystick, voice recognition interface, or other user input interfaces. Display 512 may be provided as a stand-alone device or integrated with other elements of each one of system 500 and devices 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech.

An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Data for use by a thick or thin client implemented on each one of system 500 and devices 501 may be retrieved on-demand by issuing requests to a server remote to each one of system 500 and user equipment devices 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. In this way, the processing of the instructions is performed remotely by the server while the resulting displays (e.g., that may include text, a keyboard, or other visuals) are provided locally on device 500.

Control circuitry may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry executes instructions for an emulation system application stored in memory (e.g., the storage). Memory may be an electronic storage device provided as storage that is part of control circuitry.

Figure 6A:
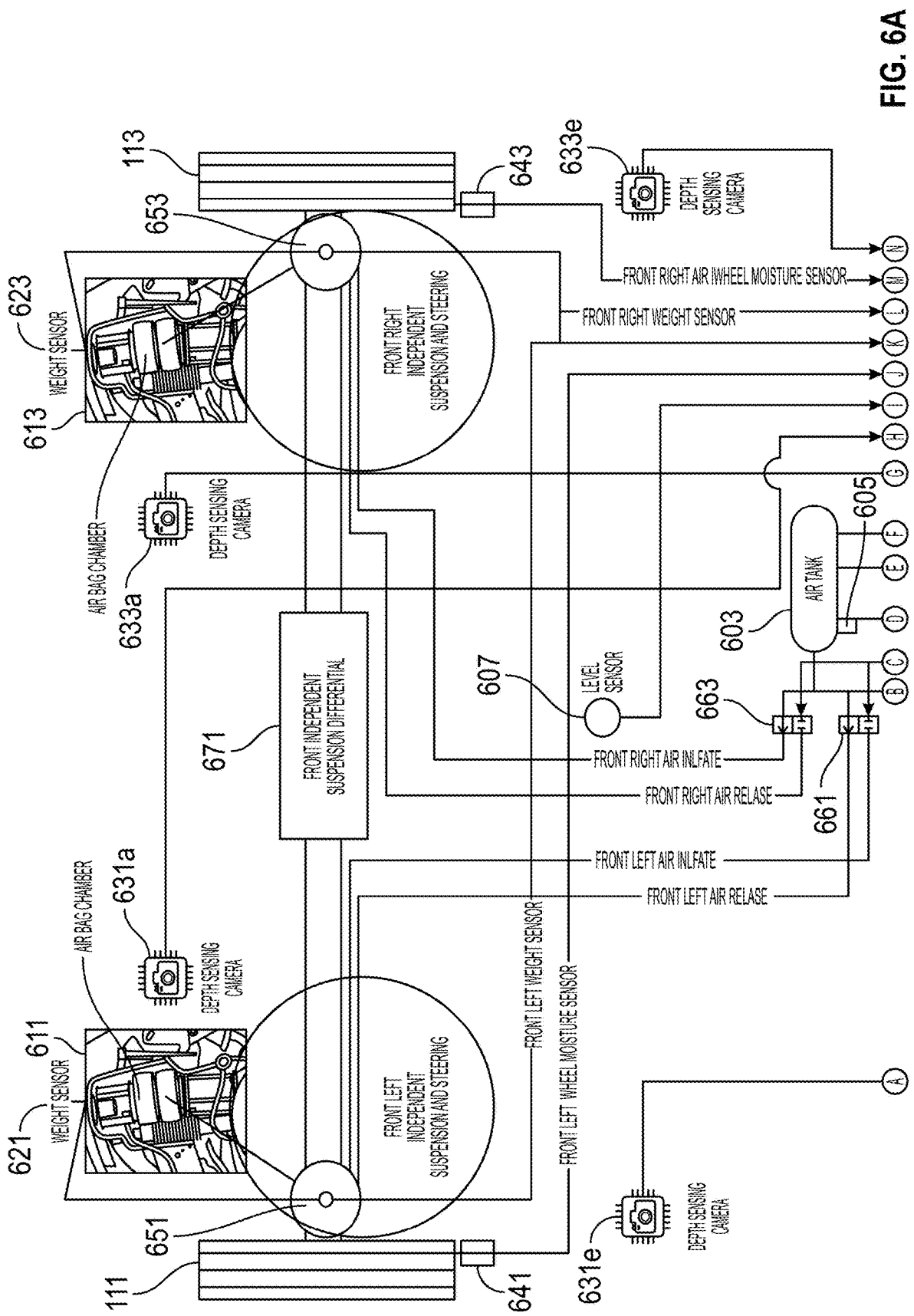
FIGS. 6A-6B illustrate an electronic control unit, suspension systems, and other components of the vehicle, according to an aspect of the disclosure.
Figure 6B:
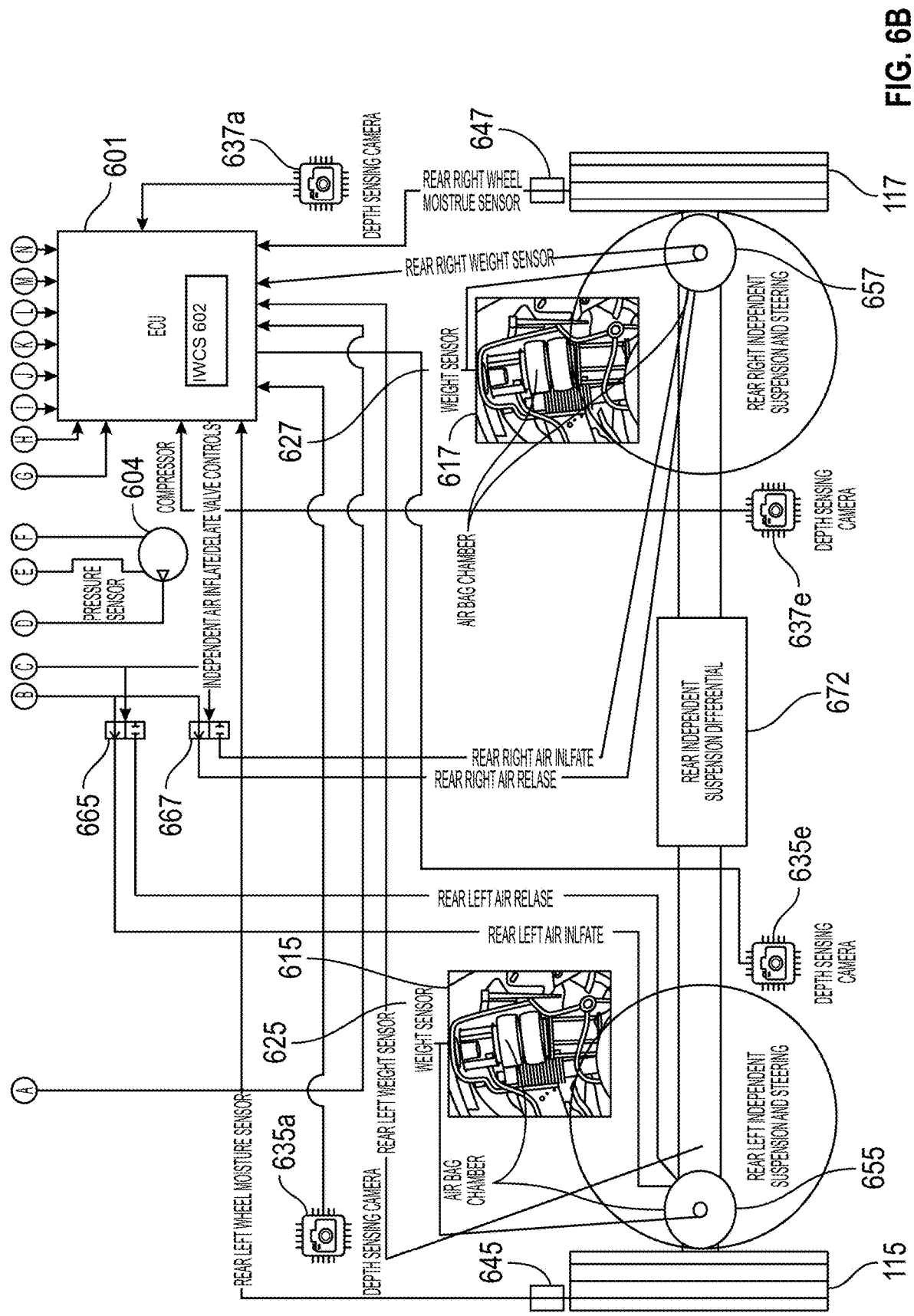

FIGS. 6A-6B show an example of an ECU 601 and vehicle components and sensors according to an aspect of the present disclosure. Each wheel 111, 113, 115, 117 of the vehicle 101 may have a corresponding suspension system 611, 613, 615, 617. The suspension systems 611, 613, 615, 617 that may include airbag chambers and respective weight sensor 621, 623, 625, 627 connected to the ECU 601. The suspension systems 611, 613, 615, 617 may be controlled by corresponding independence suspension and steering systems 651, 653, 655, 657, respectively, which may be connected to the ECU 601.

A variety of sensors may also be positioned at each wheel, including front left wheel weight sensor 621 and front left wheel moisture sensor 641 provided at or near front left wheel 111, as well as depth sensing cameras 631a, 631b. Similarly, front right wheel weight sensor 623 and front right wheel moisture sensor 643, as well as depth sensing cameras 633a, 633b may be provided at or near right front wheel 113, left rear wheel weight sensor 625 and left rear wheel moisture sensor 645, as well as depth sensing cameras 635a, 635b may be provided at or near left rear wheel 115, and right rear wheel weight sensor 627 and right rear wheel moisture sensor 647, as well as depth sensing cameras 637a, 637b may be provided at or near right rear wheel 117.

Additional sensors, such as additional depth sensing cameras, may be positioned at or near the wheels and/or at various portions of the vehicle, such as at the underside of the vehicle body, for example, air pressure sensors for each wheel (not shown). FIGS. 6A-6B also illustrate other sensors that may also be connected to, or provided integrally formed, with ECU 601, including level sensor 607. FIGS. 6A-6B illustrate air intake and air release lines that may control the ride height at respective portions of the vehicle body, and thus control weight distribution of the vehicle, by controlling air pressure in the air chamber of the suspension system at each wheel. The air intake and air release lines for the suspension at each wheel are controlled by air pressure control system 661, 663, 665, 667 for respective wheels 111, 113, 115, 117 of the vehicle, connected to air tank 603 provided with compressor 604 and a pressure sensor 605 for managing each of the air inflate and air release lines. The may be fed readings from the pressure sensor 605 to control the compressor 604 and the air tank 603 as well as the air pressure control system 661, 663, 665, 667 for respective wheels 111, 113, 115, 117.

Figure 7:
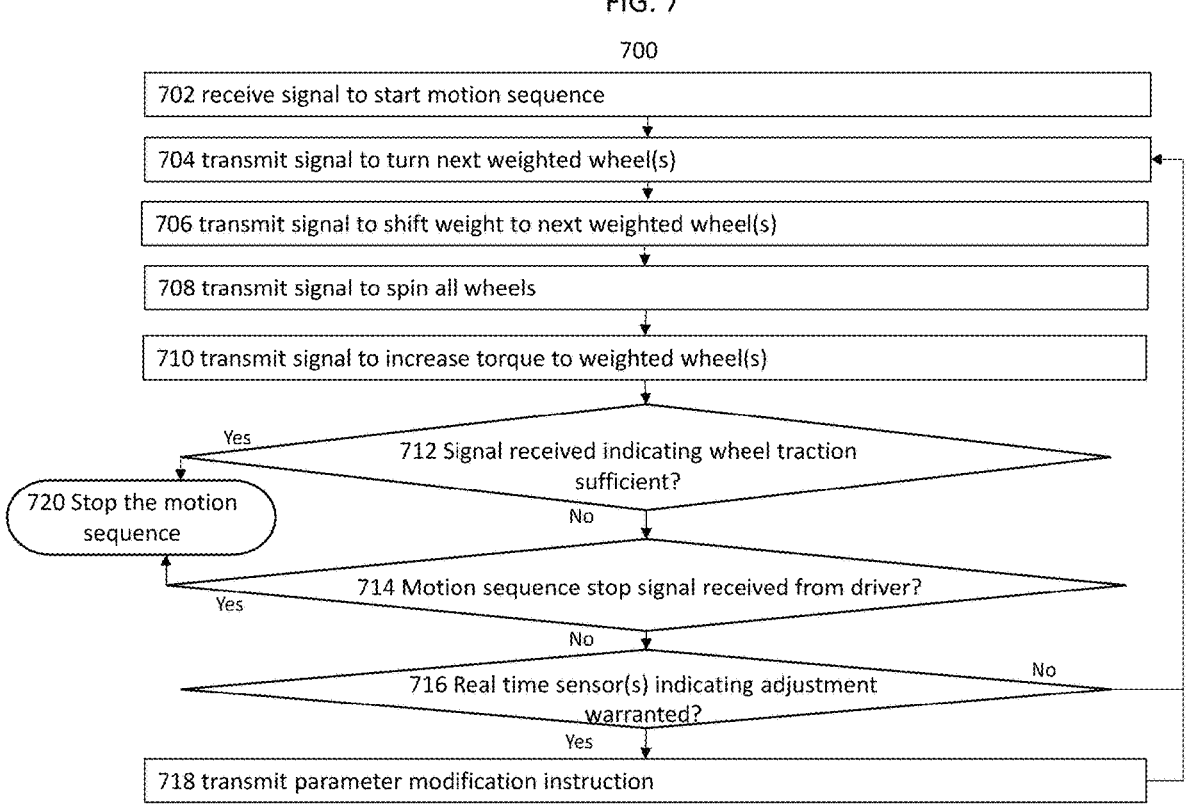
FIG. 7 is a flowchart showing operations for producing a motion sequence, according to an aspect of the disclosure.

FIG. 7 is a flowchart that illustrates a process according to an aspect of the disclosure. The method 700 may be implemented, in whole or in part, by the system 501 shown in FIG. 5 working in concert with other vehicle components illustrated in FIG. 6. One or more actions of the method 700 may be incorporated into or combined with one or more actions of any other process or embodiments described herein. The method 700, or portions thereof, may be saved to a memory or storage (e.g., of the systems shown in FIG. 5) or locally as one or more instructions or routines, which may be executed by any suitable device or system having access to the memory or storage to implement the method 700.

As shown in FIG. 7, at 702 the system receives a signal to start a motion sequence. One or more sensor data may be received, based on which the ECU 601 may determine that one or more wheels lack sufficient traction. This may be a signal that the motion sequence is warranted. Or, the ECU 601 may receive driver input requesting the commencing of the motion sequence.

At 704, the system may transmit an instruction to turn a wheel that is to be the next weighted wheel away from being parallel with the longitudinal axis of the vehicle 101. As shown at T2 of FIG. 2A, the left front wheel 111 may be turned left.

At the same time as 704, thereafter, or before, at 706, the system may transmit a command to shift weight onto this wheel, for example, by lowering the suspension at this wheel. Lowering or raising the vehicle body, or portions thereof, may be controlled by the air pressure control system 661, 663, 665, 667, controlling the pressure of the suspension system at respective wheels based on the weight distribution measured by the weight sensors 621, 623, 625, 627. One, two, three or all suspension systems may be raised simultaneously as needed for the undulation sequence. In addition to pneumatic or air suspension systems, hydropneumatic suspension systems and hydraulic suspension systems are also contemplated, or more than one of these approaches may be used in the same vehicle. As shown at T2 of FIG. 2A, the left front wheel 111 becomes the weighted wheel. It will be understood that vehicle body weight shifting may cause one or more additional wheels to also become weighted wheels at T2.

At 708, the system may transmit an instruction to spin all the wheels. In an embodiment, each wheel may be powered separately as part of an all-wheel drive (AWD) system, a four-wheel drive (4WD) system, or the rear wheels may be powered and spun together, or the front wheel wheels may be powered and spun together.

At 710, the system may transmit an instruction to increase torque to the weighted wheel, which at T2 is the front left wheel 111. One or more other wheels may be spun with additional wheels torque in addition to, or instead of, the weighted wheel.

At 712, the system may determine whether one or more signals have been received that indicate that sufficient traction to the wheels has been restored. For example, a lack of traction may be indicated by an excessive spin speed of a wheel compared with other wheels of the vehicle or compared with the amount of torque applied to the wheel. Conversely, sufficient traction may be determined based on such factors. If yes, then processing stops at 720.

If the system at 712 determines that such an indication has not been received (or makes no determination that such an indication has been received), then at 714, the system determines whether a driver triggered motion sequence stop signal has been received. If yes, then processing stops at 720. Similarly, if the engine of the vehicle is turned off then processing stops at 720.

If the system at 714 determines that such a stop signal has not been received (or makes no determination that the stop signal has been received), then at 716, the system determines whether one or more signals has been received that indicates that modification is necessary or desirable for the motion sequence parameters. For example, vehicle sensors may indicate that a nearby tree would block further movement to the left.

At 718, based on a determination made according to the one or more signals received at 714, the system may transmit one or more commands to modify parameters of the motion sequence. For example, the system may modify the motion sequence to prevent turning the wheels left while the object is detected near the left of the vehicle. Processing then returns to 704 to turn the next wheel of the vehicle and to shift vehicle weight to that next wheel.

Figure 8:
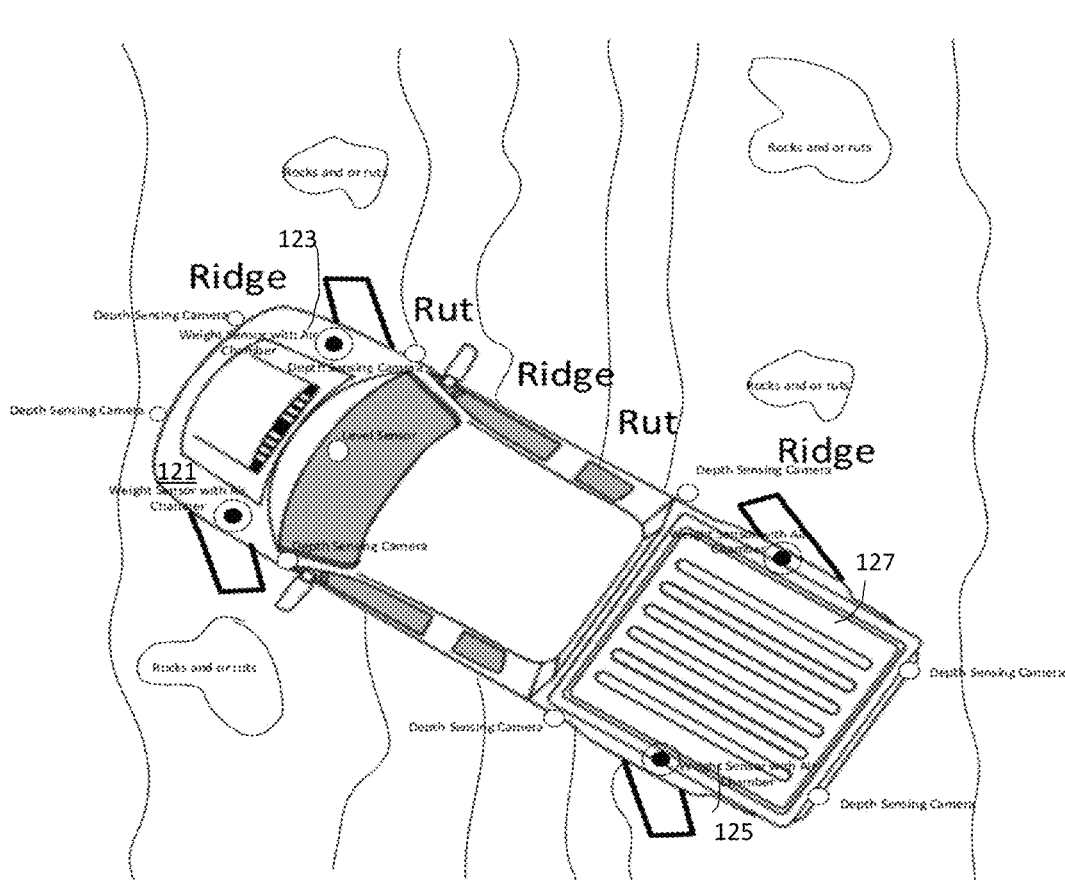
FIG. 8 illustrates a vehicle traversing uphill, downhill or other rough terrain, according to an aspect of the disclosure.

FIG. 8 illustrates an example of a terrain movement sequence of actions to assist the vehicle 101 in climbing or descending a hill or ridge, according to a hill climbing/ descending embodiment of the present disclosure. The vehicle 101 may climb a hill with each wheel independently adjusting the turn angle to avoid ruts, rocks or high points that could cause the vehicle to bottom out or otherwise to get stuck. While vehicle 101 is shown with all four wheels turned away from the longitudinal axis of the vehicle and toward the hill incline, it will be understood that a vehicle that has only two turning wheels is also contemplated. Weight sensors 621, 623, 625, 627, which may be formed integrally with or located at respective wheel suspension systems 611, 613, 615, 617, may provide the ECU 601 with the input needed to adjust suspension systems at the wheels. Optimally, the weight distribution of the vehicle is dynamically adjusted in real time, such that the weight of the vehicle body is maintained substantially equally across the four wheels, or at least such that system continues to attempt to balance the weight load of the vehicle body to each wheel. In addition, one or more depth cameras may detect distance to the ground. Based on such data, the ECU 601 may manage the suspension systems to avoid bottoming out— positioning the bottom of the vehicle body too low to the ground so that the vehicle body bottom or side comes into significant contact with the terrain, including rocks or other protrusions thereon. The term climb as used herein may sometime mean ascend uphill, descend downhill or move through uneven terrain. A sequence of actions described for the climbing, descending and/or navigating over uneven terrain may sometimes be referred to herein as a terrain movement sequence.

In an embodiment, as the vehicle 101 moves uphill, all four wheels may be turned to point uphill as shown in FIG. 8. The ride suspension may be adjusted to elevate the downhill facing side 121, 125 of the vehicle body. This may tend to level the vehicle body, or at least to decrease the elevation difference between the top of the right side 123, 127 of the vehicle 101 and the top of the left side 121, 125 of the vehicle, and thus may tend to reduce the likely of the vehicle 101 rolling down the hill. As each rut or rock is encountered on the terrain, the air ride suspension may be dynamically adjusted to optimize the weight distribution so that the weight borne by each of the four wheels remains substantially the same. This may also increase driver visibility, particularly as the driver looks ahead and down to spot bumps or other terrain features, and may improve passenger comfort as the vehicle provides a more level ride. Similarly, when the vehicle descends a hill or ridge, the suspension systems at the left wheels 111, 115 may raise the left side of the vehicle body 121, 125 to attempt to level the vehicle 101 or at least to diminish the difference in elevation between the two sides of the vehicle, and/or the suspension systems at the right wheels 113, 117 may raise the right side of the vehicle body 123, 127 to attempt to level the vehicle 101, or at least to diminish the difference in elevation between the two sides of the vehicle, which may also reduce the risk of vehicle rollover.

FIG. 8 illustrates a vehicle with a "crab walking" feature, which entails a vehicle with four-wheel steering moving diagonally or sideways—both the front wheels and rear wheels turn in the same direction. However, an embodiment in a vehicle without four-wheel steering is also contemplated.

If the vehicle climbs the hill with the front of the vehicle 101 facing the hill—with the hill nearly perpendicular to the longitudinal axis of the vehicle 101, the suspension systems at the rear wheels 115, 117 may raise the rear portions 125, 127 of the vehicle body and/or the suspension systems at the front wheels 111, 113 may lower the front portions 121, 123 of the vehicle body. Thus the system may attempt to bring the vehicle body to a level or near level position, or at least to reduce the difference between the elevation of the front portions 121, 123 of the vehicle body and the rear portions 125, 127 of the vehicle body.

Figure 9:
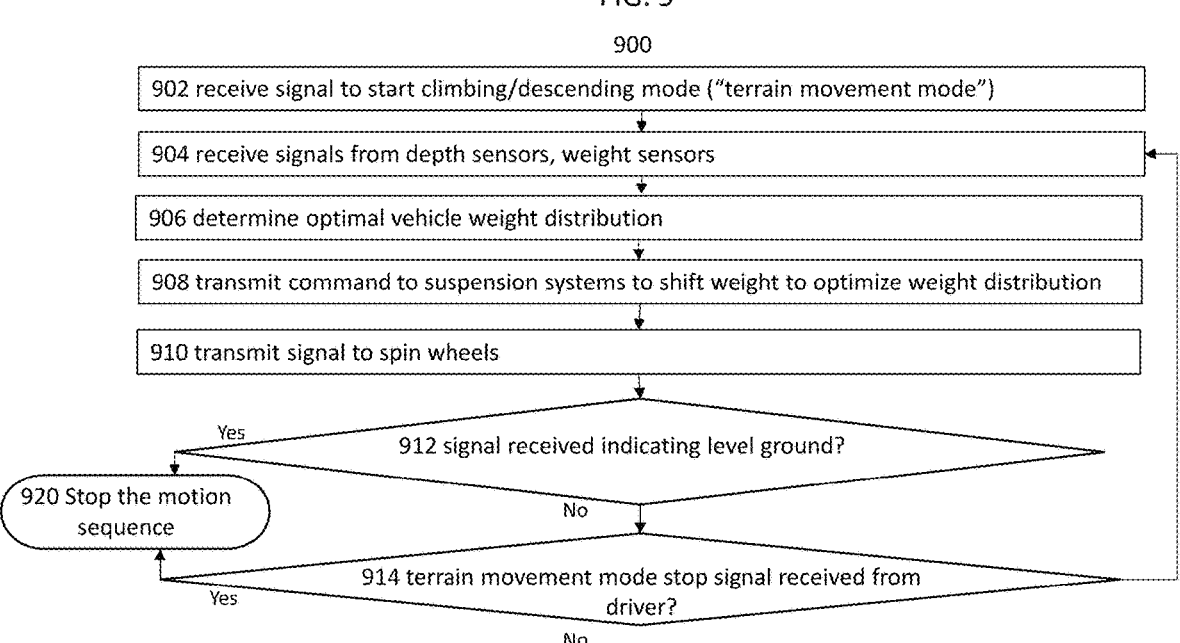
FIG. 9 is a flowchart showing operations for enhancing vehicle stability when traversing the uphill downhill or rough terrain, according to an aspect of the disclosure.

FIG. 9 is a flowchart that illustrates a process according to an aspect of the disclosure. The method 900 may be implemented, in whole or in part, by the system 501 shown in FIG. 5 working in concert with other vehicle components illustrated in FIG. 6. One or more actions of the method 900 may be incorporated into or combined with one or more actions of any other process or embodiments described herein. The method 900, or portions thereof, may be saved to a memory or storage (e.g., of the systems shown in FIG. 5) or locally as one or more instructions or routines, which may be executed by any suitable device or system having access to the memory or storage to implement the method 900.

As shown in FIG. 9, at 902 the system receives a signal to enter a climbing/descending mode. Data from one or more sensors, for example, data from one or more depth cameras showing that the ground is substantially more distant from the vehicle body on the left side of the vehicle than it is on the right side of the vehicle body, may be received, based on which the ECU 601 may determine that the climbing/descending mode is warranted. Or, the driver may request entry into the climbing/descending mode.

At 904, the system may receive real time data, for example, weight sensor data indicating how much of the vehicle body weight is borne by each wheel of the vehicle. When the suspensions at all wheels are set to the same normal ride height, a wheel that is lower due to the slope of the terrain, or due to the unevenness of an off-road terrain, may be bearing more of the vehicle weight due to the shifting toward that wheel of the center of gravity of the vehicle. For this reason, the ECU may determine a sloping or uneven terrain based on weight sensor data.

At 906, the system may determine optimal weight distribution based on factors such as depth camera data indicating distances of various portions of the vehicle body to the ground, vehicle level sensor data indicating whether the vehicle body is level or how much higher/lower is one part of the vehicle than another part of the vehicle. Additional vehicle sensor data, for example, vehicle speed and the turning angle of one or more wheels of the vehicle may also be considered in the optimization.

In an embodiment, an even weight distribution across all wheels is considered optimal. In an embodiment, the system attempts to even out the height of all parts of the vehicle body. For example, the system may instruct suspension systems at the side of the vehicle facing the hill incline to lower the vehicle body.

At 908, the system may transmit commands to optimize vehicle body weight distribution based on the determination made at 906. In the illustration provided in FIG. 8, the suspension system at the right front wheel 113, farthest up the hill, may position the vehicle body at the lowest ride height. The second lowest ride height may be commanded for the suspension system at the left front wheel 111, or for the suspension system at the right rear wheel 117. The suspension system at the left rear wheel 115 may be set at a ride height higher than the suspension system at any other wheel. It will be understood however that the system may command real time adjustments based on the position and height of rocks or of other objects, dips in the terrain, curves in the path of the vehicle and other factors.

At 910, the system command all powered wheels to spin. In an embodiment, one or more wheels may be spun with greater torque than other wheels.

At 912, the system may receive data indicating that level ground or a smooth road surface has been reached. If so, the climbing/descending motion sequence is stopped at 920.

At 914, the system may receive a climbing/descending mode stop signal from the driver, in which case the climbing/descending motion sequence is stopped at 920. Otherwise, processing returns to 904.

Figure 10:
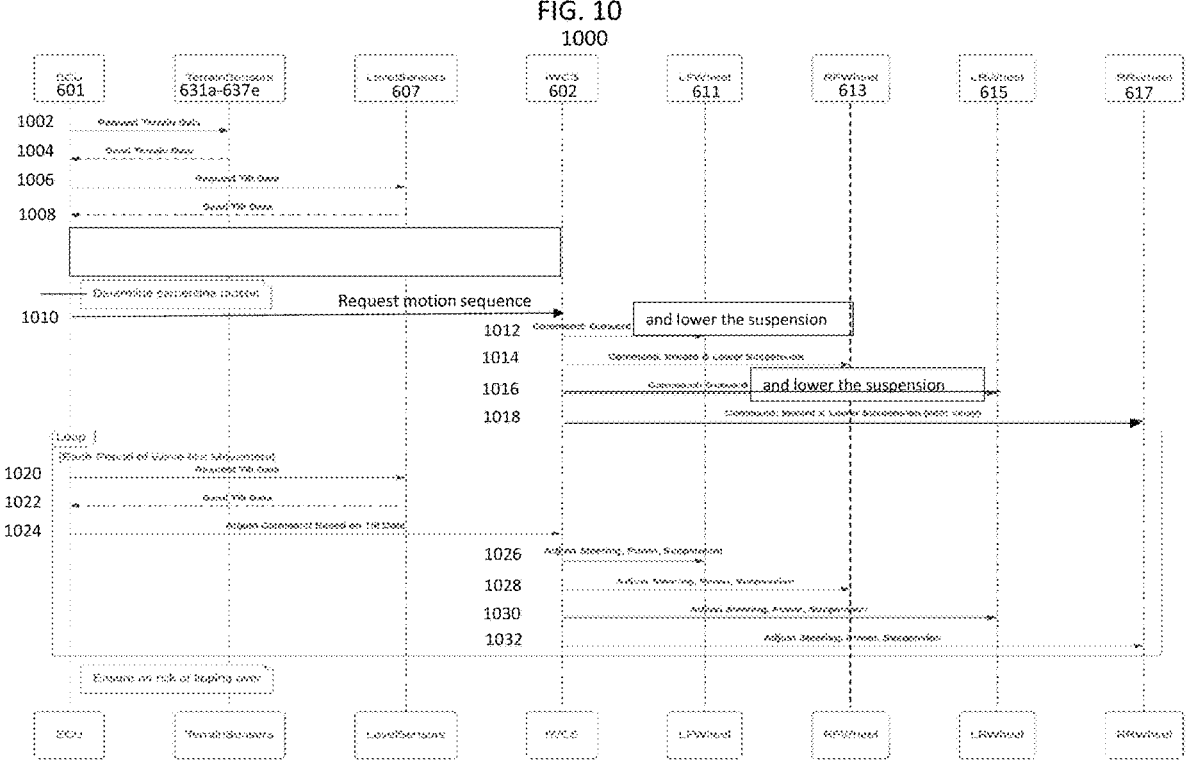
FIG. 10 is a communication flow diagram for controlling the motion sequence operations, according to an aspect of the disclosure.

FIG. 10 is a communication flow diagram that illustrates a process according to an aspect of the disclosure. The method 1000 may be implemented, in whole or in part, by the system 501 shown in FIG. 5 working in concert with other vehicle components illustrated in FIG. 6. One or more actions of the method 1000 may be incorporated into or combined with one or more actions of any other process or embodiments described herein. The method 1000, or portions thereof, may be saved to a memory or storage (e.g., of the systems shown in FIG. 5) or locally as one or more instructions or routines, which may be executed by any suitable device or system having access to the memory or storage to implement the method 1000.

At 1002 of FIG. 10, the ECU 601 requests terrain data from terrain sensors 631a-637e. In the illustration provided in FIGS. 6A and 6B, the terrain sensors are provided as depth cameras, however other types of terrain sensors may be provided in addition to, or instead of, depth cameras, for providing information about the terrain and/or about a substance at one or more of the wheels that is causing a loss of traction. While eight depth cameras are illustrated, more or fewer may be provided.

At 1004, terrain data is transmitted from terrain sensors 631a-637e. The ECU 601 may also request other types of data from a variety of sensor, for example, data regarding the traction of one or more of the wheels.

At 1006, the ECU requests tilt data from level sensors 607. The tilt data concern the degree to which the vehicle body is level or tilted from a horizontal position.

At 1008, the ECU 601 receives the tilt data from level sensors 607. This data as well as other data inputs to the ECU 601 may be continuously provided to the ECU throughout the sequence of operations described herein, either in response to request by the ECU or at other times, for example, on a periodic basis or before the commencement of any operation described herein. Based on the data received, the ECU 601 may determine whether the motion sequence described herein is necessary for the vehicle 101, for example, by determining whether one or more wheels or the vehicle has lost traction. If the motion sequence is determined to be necessary, then the ECU is 601 may decide with which wheel or wheels the motion sequence is to start. The motion sequence may begin with the wheel(s) with the most traction or with the wheel that has the least traction.

At 1010, the ECU 601 transmits a motion sequence request to the independent wheel control system (IWCS) 602. The IWCS 602 is shown in FIG. 6 to be a component of, or as integrally connected with, the ECU 601, but the IWCS may be a separate unit remote from the ECU 601, or may be provided as four separate components for respective wheels. Also, while shown as single four-wheel motion sequence request, the ECU 601 may transmit a separate motion sequence request for each set of operations for each wheel, or for each operation of each wheel, for example, for each turning of the each wheel and for each lowering of the suspension system at each wheel.

At 1012, the IWCS 602 starts the motion sequence by transmitting a command to the left front wheel 611 to turn, in this case outward (left), and transmits a command to the suspension system at the left front wheel to lower the corresponding portion of the body of the vehicle. As discussed, one or more additional commands to the suspension systems at the other wheels may also be transmitted at this time to raise the corresponding portions of the vehicle body.

At 1014, the IWCS 602 transmits a command to the right front wheel 613 to turn, in this case inward (left), and transmits a command to the suspension system at the right front wheel to lower the corresponding portion of the vehicle body. There may be a set time delay between the commands at 1012 and 1014, between the commands at 1014 and 1016, between the commands at 1016 and 1018 to obtain an undulating a wave-like motion for the vehicle body.

At 1016, the IWC 602 transmits a command to the left rear wheel 615 to turn, in this case outward (left), and transmits a command to the suspension at the left rear wheel 615 to lower the corresponding portion of the vehicle body. As discussed with regard to the description of FIGS. 2-6, greater torque may be provided to one or more of the wheels after each time the vehicle is lowered at each wheel.

At 1018, the IWC 602 transmits a command to the right rear wheel 617 to turn, in this case inward (left), and transmits a command to the suspension at the right rear wheel 617 to lower the corresponding portion of the vehicle body. It will be noted that the communication diagram illustrated FIG. 10 shows one embodiment of the disclosure, analogous communication diagrams, mutatis mutandis, may be used for other embodiments.

After the four-wheel sequence described, the ECU 601 may determine whether a further such movement sequence is necessary to free the vehicle. If so, then a four-wheel sequence is repeated and may be done such that each wheel is turned in the direction opposite from the earlier four-wheel sequence, in this case the wheels may now turned right. In between each four-wheel sequence, the wheels may first be turned to point forward and/or all suspensions may be raised.

At 1020, the ECU 601 may request tilt data from level sensors 607. Or such data may be provided continuously or from time to time without a separate request.

At 1022, the tilt data is transmitted from the level sensors 607 to the ECU 601. ECU may evaluate this and other data, including data regarding which wheel(s) is/are stuck and to what extent traction is lost, and, at 1024, the ECU may command an adjusting of the four-wheel sequence based on such data.

As shown at 1026, the IWCS 602 may adjust the direction in which each wheel is turned or the amount of turning of each wheel, the amount of power provided to each wheel, including the torque provided to each wheel, the amount of raising or lowering of the corresponding part of the vehicle body by the suspension system at each wheel, and other factors.

At 1028, such adjustments may also be commanded for the right front wheel 613. Described sometimes herein as a command to a wheel, it will be understood that the commands from the IWCS 602 may be transmitted to the powertrain of the vehicle to control torque, the air pressure control system 661, 663, 665, 667 working in concert with the suspension systems, and to other vehicle components and systems as necessary for the present operations.

At 1030, such adjustments may also be commanded for the left rear wheel 615. Some of the adjustments described may be made for one or more of the wheels but not for other wheels.

At 1032, such adjustments may also be commanded for the right rear wheel 615. Following any such adjustments, if necessary, the next four-wheel cycle may begin.

The methods or processes 600, 900 and/or 1000 may be implemented, in whole or in part, by the system(s) described herein and shown in the figures. One or more actions of the depicted processes may be incorporated into or combined with one or more actions of any other process or embodiments described herein. The processes may be saved to a memory as one or more instructions or routines that may be executed by a corresponding device or system to implement the process. Depending on the embodiment, one or more steps of the described process may be implemented or facilitated by a server.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:
   receiving a signal to start a motion sequence for a vehicle; and
   causing the vehicle to perform the motion sequence, by:
   (a) shifting more of a weight of the vehicle onto a first wheel of wheels of the vehicle compared to a weight of the vehicle borne by any of other wheels of the vehicle;
   (b) turning the first wheel away from a longitudinal axis of the vehicle;
   (c) spinning the first wheel of the vehicle; and
   (d) repeating operations (a)-(c) for each of the other wheels of the vehicle sequentially.

2. The method of claim 1, wherein operation (c) comprises spinning all wheels of the vehicle.

3. The method of claim 1, wherein the operations (a)-(c) are performed simultaneously.

4. The method of claim 1, wherein the operations (a)-(c) are performed in an order:
   (b) followed by (a) followed by (c) followed by (d).

5. The method of claim 1, wherein operation (c) comprises:
   applying more torque to a weighted wheel bearing more of a shifted weight of the vehicle than to any of the other wheels of the vehicle.

6. The method of claim 1, wherein operation (c) comprises:
   spinning the wheels of the vehicle in a first spinning direction, and
   wherein the motion sequence further comprises:
   (e) turning all the wheels of the vehicle to be aligned with the longitudinal axis of the vehicle; and then;
   (f) turning the first wheel away from the longitudinal axis of the vehicle in a second direction different from a first direction;
   (g) shifting more of the weight of the vehicle onto the first wheel compared to the weight of the vehicle borne by any of other wheels of the vehicle;
   (h) spinning the first wheel of the vehicle; and
   (i) repeating operations (f)-(g) for each of the other wheels of the vehicle sequentially.

7. The method of claim 6, wherein operation (h) comprises spinning the wheels of the vehicle in a first spinning direction, and wherein the motion sequence further comprises:

(j) aligning all the wheels of the vehicle with the longitudinal axis of the vehicle; and then;

(k) continually repeating steps (a)-(j) until receiving a signal to stop the motion sequence for the vehicle.

8. The method of claim 7, wherein the signal to stop the motion sequence of the vehicle is automatically transmitted in response to receiving a vehicle sensor signal indicating that a wheel of the vehicle has sufficient traction.

9. The method of claim 1, wherein the operation (a) comprises:

lowering, using an adjustable suspension system associated with the first wheel, a first portion of the vehicle to a first ride height at the first wheel, wherein the first ride height is lower than a second ride height of a remaining portion of the vehicle at the other wheels of the vehicle.

10. The method of claim 1, wherein operation (a) comprises:

elevating, using an adjustable suspension systems associated with wheels of the vehicle other than the first wheel, a first portion of the vehicle to a first ride height at the wheels of the wheels other than the first wheel, wherein the first ride height is higher than a second ride height of the vehicle at the first wheel.

11. The method of claim 1, further comprising:

based at least in part on receiving vehicle sensor data, adjusting a first ride height of the vehicle at the first wheel or adjusting a second ride height of a remaining portion of the vehicle at the other wheels of the vehicle, wherein the second ride height of the vehicle is higher than the first ride height of the vehicle.

12. The method of claim 1, further comprising:

based at least in part on to receiving vehicle sensor data, adjusting how far the first wheel is turned away from the longitudinal axis of the vehicle.

13. The method of claim 1, wherein operation (d) further comprises:

based at least in part on receiving vehicle sensor data, adjusting a speed of the repeating of operations (a)-(c).

14. A method comprising:

receiving a signal to start a motion sequence for a vehicle;

causing the vehicle to perform the motion sequence by transmitting instructions automatically to commence a first set of operations comprising:

(a) turning front wheels in a first direction away from a longitudinal axis of the vehicle;

(b) turning rear wheels in a second direction away from the longitudinal axis of the vehicle;

(c) shifting more of a weight of the vehicle onto wheels on a first side of the vehicle than the weight of the vehicle borne by wheels on a second side of the vehicle;

(d) spinning both the front wheels and the rear wheels of the vehicle; and then continuing to cause the vehicle to perform the motion sequence by transmitting instructions automatically to commence a second set of operations comprising:

(e) turning the front wheels in the second direction away from the longitudinal axis of the vehicle;

(f) turning the rear wheels in the first direction away from the longitudinal axis of the vehicle;

(g) shifting more of the weight of the vehicle onto the wheels on the first side of the vehicle or onto the wheels on the second side of the vehicle than the weight of the vehicle borne by remaining wheels of the vehicle;

(h) spinning both the front wheels and the rear wheels of the vehicle; and repeating automatically the first set of operations (a)-(d) followed by the second set of operation (e)-(h).

15. The method of claim 14, wherein the operations (a)-(c) are performed simultaneously.

16. The method of claim 14, wherein the operations (a)-(c) are performed in an order:

(a) followed by (b) followed by (c).

17. The method of claim 14, wherein the motion sequence further comprises aligning, before operation (e), all the wheels of the vehicle with the longitudinal axis of the vehicle.

18. The method of claim 14, wherein the repeating of the first set of operations and of the second set of operations is continued until a signal to stop the motion sequence is received, wherein the signal to stop the motion sequence is automatically transmitted in response to receiving vehicle sensor signaling indicating that a wheel of the vehicle has sufficient traction.

* * * * *